US011303022B2

United States Patent
Avser et al.

(10) Patent No.: US 11,303,022 B2
(45) Date of Patent: Apr. 12, 2022

(54) ELECTRONIC DEVICES HAVING ENCLOSURE-COUPLED MULTI-BAND ANTENNA STRUCTURES

(71) Applicant: Apple Inc., Cupertino, CA (US)

(72) Inventors: Bilgehan Avser, Mountain View, CA (US); Xu Han, Santa Clara, CA (US); Salih Yarga, Sunnyvale, CA (US); Jingni Zhong, Campbell, CA (US); Hao Xu, Cupertino, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 16/553,045

(22) Filed: Aug. 27, 2019

(65) Prior Publication Data

US 2021/0066799 A1    Mar. 4, 2021

(51) Int. Cl.
  *H01Q 5/25*  (2015.01)
  *H01Q 1/48*  (2006.01)
  *H01Q 23/00* (2006.01)
  *H04B 1/38*  (2015.01)

(52) U.S. Cl.
  CPC .............. *H01Q 5/25* (2015.01); *H01Q 1/48* (2013.01); *H01Q 23/00* (2013.01); *H04B 1/38* (2013.01)

(58) Field of Classification Search
  CPC . H01Q 5/25; H01Q 1/48; H01Q 23/00; H04B 1/38
  USPC .... 455/77, 73; 343/770, 702, 745, 848, 750, 343/729
  See application file for complete search history.

(56) References Cited

U.S. PATENT DOCUMENTS

| | | | |
|---|---|---|---|
| 7,212,161 B2 | 5/2007 | Chen et al. | |
| 8,050,291 B1* | 11/2011 | Prasad | H04B 1/7163 370/467 |
| 9,105,966 B1 | 8/2015 | Dou et al. | |
| 9,350,069 B2* | 5/2016 | Pascolini | H01Q 1/243 |
| 9,711,841 B2* | 7/2017 | Yong | H01Q 5/335 |
| 9,972,891 B2 | 5/2018 | Ayala Vazquez et al. | |
| 10,263,334 B2 | 4/2019 | Hu et al. | |
| 10,305,197 B2 | 5/2019 | Henry et al. | |
| 10,411,327 B2 | 9/2019 | Kim et al. | |

(Continued)

FOREIGN PATENT DOCUMENTS

EP    3041084 B1    4/2019

*Primary Examiner* — Ernest G Tacsik
*Assistant Examiner* — Max Mathew
(74) *Attorney, Agent, or Firm* — Treyz Law Group, P.C.; Michael H. Lyons; Tianyi He

(57) ABSTRACT

An electronic device may be provided with a housing and an antenna having a resonating element. The resonating element may have first and second arms extending from opposing sides of a feed. The first arm and a portion of the housing may radiate in a cellular ultra-high band. The first arm may have a fundamental mode that radiates in a first ultra-wideband (UWB) communications band at 6.5 GHz. The second arm may have a fundamental mode that radiates in a 5.0 GHz wireless local area network band. The first and second arms may have a harmonic mode that radiates in a second UWB communications band at 8.0 GHz. The antenna may convey radio-frequency signals in each of these communications bands without the need for adjusting components in the antenna to switch between the UWB communications bands.

20 Claims, 9 Drawing Sheets

(56) References Cited

U.S. PATENT DOCUMENTS

| | | | |
|---|---|---|---|
| 2009/0160712 A1* | 6/2009 | Breiter | H01Q 5/371 343/702 |
| 2009/0195466 A1* | 8/2009 | Tsai | H01Q 1/2266 343/741 |
| 2009/0237307 A1* | 9/2009 | Tsai | H01Q 1/38 343/700 MS |
| 2009/0256769 A1* | 10/2009 | Kan | H01Q 9/285 343/819 |
| 2010/0090913 A1* | 4/2010 | Liu | H01Q 1/48 343/702 |
| 2013/0127673 A1* | 5/2013 | Chang | H01Q 21/28 343/702 |
| 2013/0328723 A1* | 12/2013 | Rappaport | H01Q 1/243 342/372 |
| 2014/0087668 A1* | 3/2014 | Mow | H04W 24/08 455/67.14 |
| 2015/0244063 A1 | 8/2015 | Sowpati | |
| 2016/0064812 A1* | 3/2016 | Han | H01Q 1/52 343/702 |
| 2016/0315373 A1* | 10/2016 | Azad | H01Q 1/48 |
| 2016/0322699 A1* | 11/2016 | Mow | H01Q 5/321 |
| 2016/0342258 A1* | 11/2016 | Han | G06F 3/02 |
| 2017/0170568 A1* | 6/2017 | Ammann | H01Q 5/378 |
| 2017/0237151 A1* | 8/2017 | Andujar Linares | H01Q 1/243 343/702 |
| 2018/0026334 A1* | 1/2018 | Chen | H01Q 9/42 343/702 |
| 2018/0026341 A1* | 1/2018 | Mow | H04B 10/90 343/702 |
| 2018/0048058 A1* | 2/2018 | Ehman | H01Q 1/48 |
| 2018/0083344 A1* | 3/2018 | Han | H01Q 19/021 |
| 2018/0090816 A1* | 3/2018 | Mow | H01Q 1/22 |
| 2019/0081410 A1 | 3/2019 | Zhou et al. | |
| 2020/0259530 A1* | 8/2020 | Wang | H01Q 5/35 |
| 2021/0135347 A1* | 5/2021 | Shi | H01Q 21/08 |
| 2021/0151879 A1* | 5/2021 | Litteer | H01Q 21/205 |
| 2021/0408684 A1* | 12/2021 | Yuen | H01Q 7/00 |

\* cited by examiner

ELECTRONIC DEVICES HAVING ENCLOSURE-COUPLED MULTI-BAND ANTENNA STRUCTURES

BACKGROUND

This relates generally to electronic devices and, more particularly, to electronic devices with wireless communications circuitry.

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas and wireless circuitry are able to exhibit satisfactory performance over a wide range of operating frequencies.

It would therefore be desirable to be able to provide improved wireless circuitry for electronic devices.

SUMMARY

An electronic device may be provided with wireless circuitry and peripheral conductive housing structures. A display may be located at a front face of the device whereas a housing wall is located at a rear face of the device. The wireless circuitry may include first, second, third, fourth, and fifth antennas, a wireless local area network (WLAN) transceiver, a cellular telephone transceiver, and an ultra-wideband (UWB) transceiver.

The third, fourth, and fifth antennas may be UWB antennas that are aligned with respective openings in ground structures for the device. The third, fourth, and fifth antennas may convey UWB signals for the UWB transceiver in first and second UWB communications bands (e.g., 6.5 GHz and 8.0 GHz bands) through the housing wall. The second antenna may have a resonating element arm formed from a segment of the peripheral conductive housing structures and a return path coupled between the segment and the ground structures. The second antenna may convey non-UWB signals for the WLAN transceiver and/or the cellular telephone transceiver.

The first antenna may have an antenna resonating element that overlaps a slot between the segment and the ground structures. The first antenna may transmit and receive non-UWB signals such as WLAN signals and cellular ultra-high band signals through the housing wall and the slot, through an inactive area of a display for the device, and/or through a gap in the peripheral conductive housing structures. The first antenna may also concurrently receive UWB signals for the UWB transceiver in both of the first and second UWB communications bands through these portions of the device.

The antenna resonating element may have a first resonating element arm and a second resonating element arm extending from opposing sides of an antenna feed. The first arm may convey antenna currents in a non-UWB communications band such as one or more cellular ultra-high bands. The antenna currents on the first arm may induce similar currents on a portion of the peripheral conductive housing structures and on a clip attached to the peripheral conductive housing structures. These currents may radiate in the cellular ultra-high band. The first arm may also have a fundamental mode that radiates in a first UWB communications band such as a 6.5 GHz UWB communications band.

The second arm of the antenna resonating element may have a fundamental mode that radiates in a non-UWB communications band such as a 5.0 GHz WLAN band. The first and second arms may have a harmonic mode that radiates in a second UWB communications band such as an 8.0 GHz UWB communications band. In this way, the antenna may concurrently cover the cellular ultra-high band, the 5.0 GHz WLAN band, and the first and second UWB communications band with satisfactory antenna efficiency and without the need to adjust a tunable component in the antenna to switch the antenna between two or more of these communications bands.

DETAILED DESCRIPTION

Figure 1:
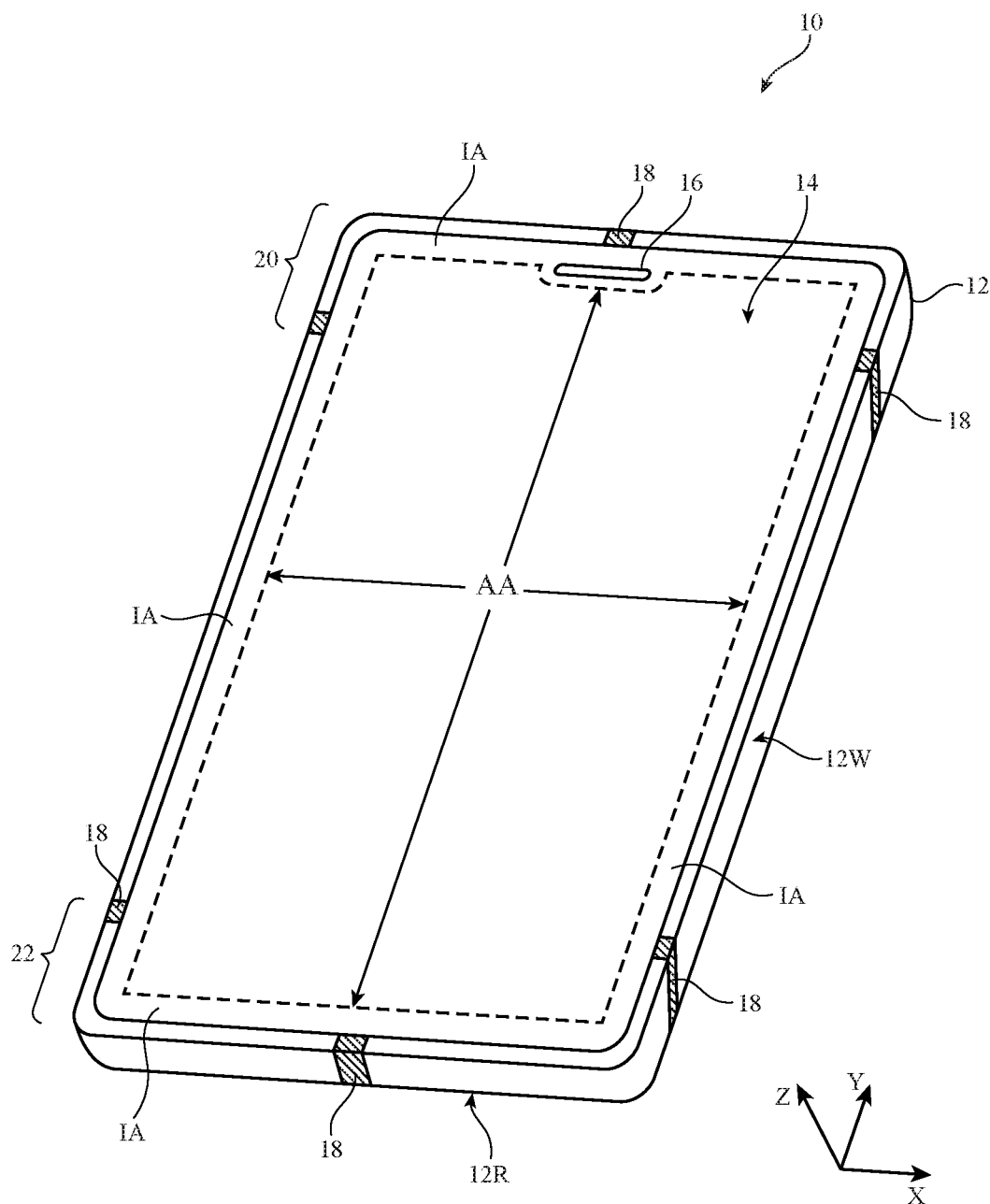
FIG. 1 is a perspective view of an illustrative electronic device in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, near-field communications bands, ultra-wideband communications bands, or other wireless communications bands.

The wireless circuitry may include one or more antennas. The antennas of the wireless circuitry can include loop antennas, inverted-F antennas, strip antennas, planar inverted-F antennas, patch antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The conductive housing structures may include peripheral structures such as peripheral conductive structures that run around the periphery of the electronic device. The peripheral conductive structures may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane and/or an antenna resonating element formed from conductive housing structures (e.g., internal and/or external structures, support plate structures, etc.).

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic. Housing 12 may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding lip that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a backplate) that spans the walls of housing 12 (i.e., a substantially rectangular sheet formed from one or more metal parts that is welded or otherwise connected between opposing sides of peripheral conductive structures 12W). The backplate may form an exterior rear surface of device 10 or may be covered by layers such as thin cosmetic layers, protective coatings, and/or other coatings that may include dielectric materials such as glass, ceramic, plastic, or other structures that form the exterior surfaces of device 10 and/or serve to hide the backplate from view of the user. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20.

In general, device 10 may include any suitable number of antennas (e.g., one or more, two or more, three or more, four or more, etc.). The antennas in device 10 may be located at opposing first and second ends of an elongated device housing (e.g., ends at regions 22 and 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. There may be, for example, two peripheral conductive segments in peripheral conductive housing structures 12W (e.g., in an arrangement with two gaps 18), three peripheral conductive segments (e.g., in an arrangement with three gaps 18), four peripheral conductive segments (e.g., in an arrangement with four gaps 18), six peripheral conductive segments (e.g., in an arrangement with six gaps 18), etc. The segments of peripheral conductive housing structures 12W that are formed in this way may form parts of antennas in device 10 if desired.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral conductive housing structures 12W and may form antenna slots, gaps 18, and other structures in device 10. Polymer or other dielectric may fill these grooves and other housing openings. In some situations, housing openings that form antenna slots and other structure may be filled with a dielectric such as air.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas (as an example). An upper antenna may, for example, be formed at the upper end of device 10 in region 20. A lower antenna may, for example, be formed at the lower end of device 10 in region 22. Additional antennas may be formed along the edges of housing 12 extending between regions 20 and 22 if desired. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, near-field communications, ultra-wideband communications, etc.

Figure 2:
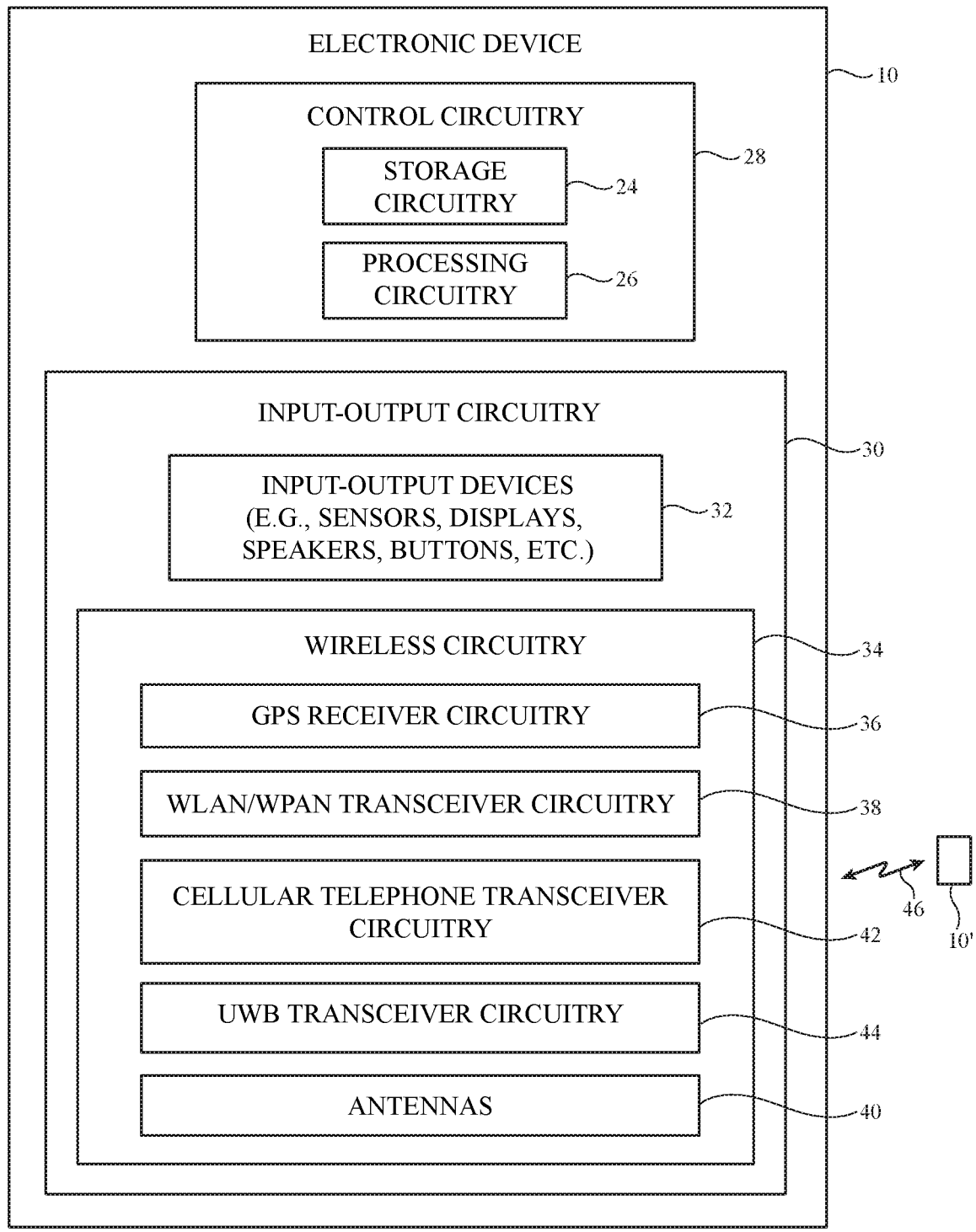
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

Device 10 may include input-output circuitry 30. Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 30 may include wireless circuitry 34. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

While control circuitry 28 is shown separately from wireless circuitry 34 in the example of FIG. 2 for the sake of clarity, wireless circuitry 34 may include processing circuitry that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 (e.g., processing circuitry 26) may include baseband processor circuitry or other control components that form a part of wireless circuitry 34.

Wireless circuitry 34 may include radio-frequency transceiver circuitry for handling various radio-frequency communications bands. For example, wireless circuitry 34 may include wireless local area network (WLAN) and wireless personal area network (WPAN) transceiver circuitry 38. Transceiver circuitry 38 may handle 2.4 GHz and 5 GHz bands for WiFi® (IEEE 802.11) communications or other WLAN bands and may handle the 2.4 GHz Bluetooth® communications band or other WPAN bands. Transceiver circuitry 38 may sometimes be referred to herein as WLAN/WPAN transceiver circuitry 38.

Wireless circuitry 34 may use cellular telephone transceiver circuitry 42 for handling wireless communications in frequency ranges (communications bands) such as a cellular low band (LB) from 600 to 960 MHz, a cellular low-midband (LMB) from 1410 to 1510 MHz, a cellular mid-band (MB) from 1710 to 2170 MHz, a cellular high band (HB) from 2300 to 2700 MHz, a cellular ultra-high band (UHB) from 3300 to 5850 MHz, or other communications bands between 600 MHz and 5850 MHz or other suitable frequencies (as examples). Cellular telephone transceiver circuitry 42 may handle voice data and non-voice data.

Wireless circuitry 34 may include satellite navigation system circuitry such as Global Positioning System (GPS) receiver circuitry 36 for receiving GPS signals at 1575 MHz or for handling other satellite positioning data (e.g., GLONASS signals at 1609 MHz). Satellite navigation system signals for receiver circuitry 36 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry (e.g., an NFC transceiver operating at 13.56 MHz or another suitable frequency), etc.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place.

Wireless circuitry 34 may include ultra-wideband (UWB) transceiver circuitry 44 that supports communications using the IEEE 802.15.4 protocol and/or other ultra-wideband communications protocols. Ultra-wideband radio-frequency signals may be based on an impulse radio signaling scheme that uses band-limited data pulses. Ultra-wideband radio-frequency signals may have any desired bandwidths such as bandwidths between 499 MHz and 1331 MHz, bandwidths greater than 500 MHz, etc. The presence of lower frequencies in the baseband may sometimes allow ultra-wideband radio-frequency signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). UWB transceiver circuitry 44 may operate (i.e., convey radio-frequency signals) in frequency bands such as an ultra-wideband communications band between about 5 GHz and about 8.3 GHz (e.g., a 6.5 GHz UWB communications band, an 8 GHz UWB communications band, and/or at other suitable frequencies).

As an example, device 10 may convey radio-frequency signals 46 at ultra-wideband frequencies with external wireless equipment 10' to determine a distance between device 10 and external wireless equipment 10' and/or to determine an angle of arrival of radio-frequency signals 46 (e.g., to determine the relative orientation and/or position of external wireless equipment 10' with respect to device 10). External wireless equipment 10' may be an electronic device like device 10 or may include any other desired wireless equipment. Radio-frequency signals conveyed by device 10 in an ultra-wideband communications band and using an ultra-wideband communications protocol (e.g., radio-frequency signals 46) may sometimes be referred to herein as ultra-wideband signals. Radio-frequency signals conveyed by device 10 in other communications bands (e.g., using communications protocols other than an ultra-wideband communications protocol) may sometimes be referred to here as non-ultra-wideband (non-UWB) signals. Non-UWB signals conveyed by device 10 may include, for example, radio-frequency signals in a cellular telephone communications band, a WLAN communications band, etc.

Wireless circuitry 34 may include antennas 40. Antennas 40 may be formed using any suitable types of antenna structures. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of two or more of these designs, etc. If desired, one or more of antennas 40 may be cavity-backed antennas.

Different types of antennas may be used for different bands and combinations of bands. For example, one type of antenna may be used in forming a local wireless link antenna and another type of antenna may be used in forming a remote wireless link antenna. Dedicated antennas may be used for conveying radio-frequency signals in a UWB communications band (e.g., UWB signals) or, if desired, antennas 40 can be configured to convey both radio-frequency signals in a UWB communications band and radio-frequency signals in non-UWB communications bands (e.g., wireless local area network signals and/or cellular telephone signals). Antennas 40 can include two or more antennas for handling ultra-wideband wireless communication. In one suitable arrangement that is described herein as an example, antennas 40 include one or more groups of three antennas (sometimes referred to herein as triplets of antennas) for handling ultra-wideband wireless communication. In yet another suitable arrangement, antennas 40 may include a triplet of sets of antennas, where each set of antenna includes four antennas that are tuned to four respective frequencies (e.g., antennas 40 may include three sets of four antennas for handling ultra-wideband wireless communication). Antennas 40 may include one or more doublets of antennas for handling ultra-wideband wireless communication if desired.

Space is often at a premium in electronic devices such as device 10. In order to minimize space consumption within device 10, the same antenna 40 may be used to cover multiple communications bands. In one suitable arrangement that is described herein as an example, each antenna 40 that is used to perform ultra-wideband wireless communication may be a multi-band antenna that conveys radio-frequency signals in at least two ultra-wideband communications bands (e.g., the 6.5 GHz UWB communications band and the 8.0 GHz UWB communications band). If desired, the same antenna 40 may cover both the 6.5 GHz UWB communications band, the 8.0 GHz UWB communications band, one or more cellular ultra-high bands, and a 5.0 GHz WLAN communications band.

Figure 3:
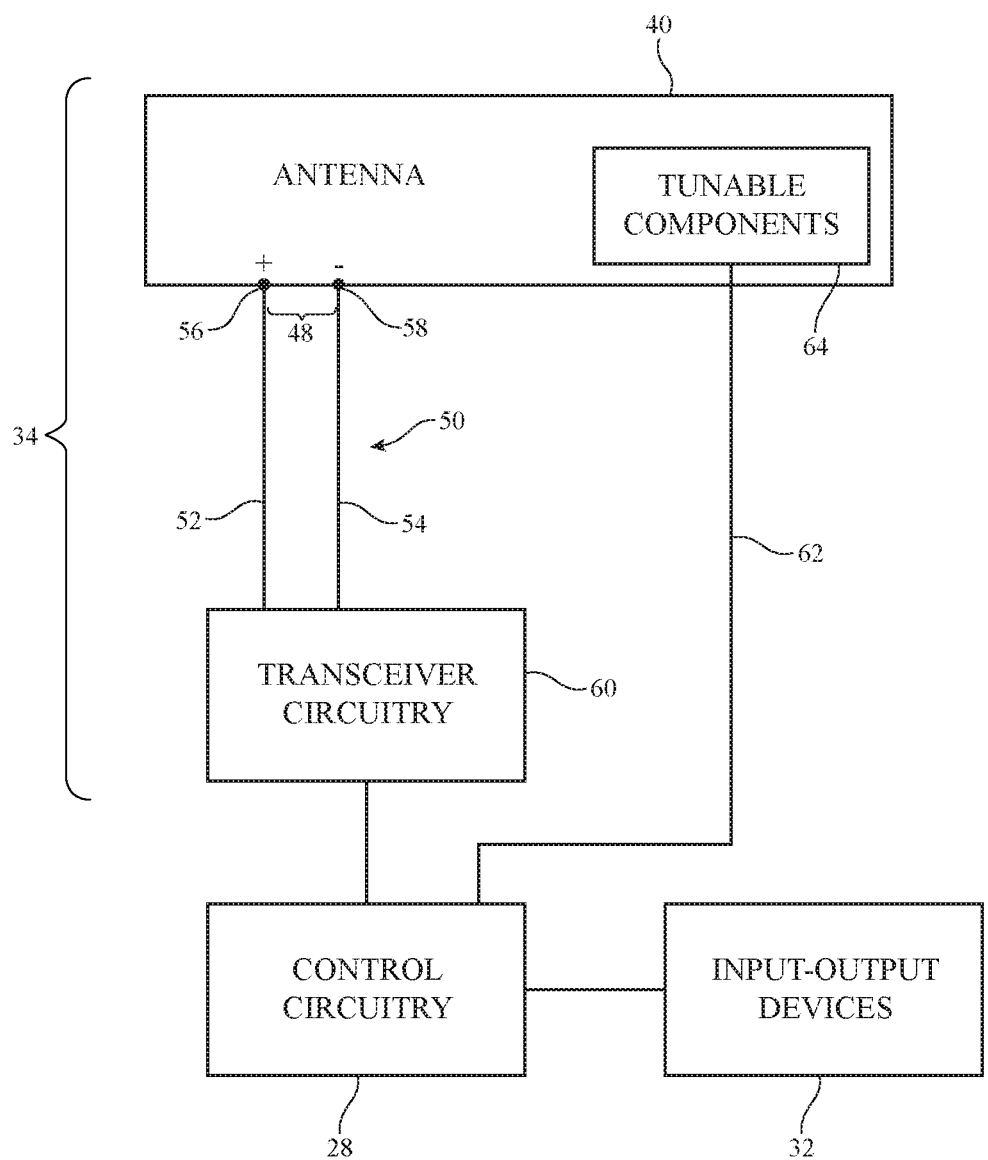
FIG. 3 is a schematic diagram of illustrative wireless circuitry in accordance with some embodiments.

As shown in FIG. 3, wireless circuitry 34 may include transceiver circuitry 60 (e.g., GPS receiver circuitry 36, WLAN/WPAN circuitry 38, cellular telephone transceiver circuitry 42, and/or UWB transceiver circuitry 44 of FIG. 2). Transceiver circuitry 60 may be coupled to antenna structures such as a given antenna 40 using a radio-frequency transmission line path such as radio-frequency transmission line path 50. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna 40 with the ability to cover communications frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components 64 to tune the antenna over communications (frequency) bands of interest. Tunable components 64 may be part of a tunable filter or tunable impedance matching network, may be part of an antenna resonating element, may span a gap between an antenna resonating element and antenna ground, etc.

Tunable components 64 may include tunable inductors, tunable capacitors, or other tunable components. Tunable components such as these may be based on switches and networks of fixed components, distributed metal structures that produce associated distributed capacitances and inductances, variable solid-state devices for producing variable capacitance and inductance values, tunable filters, or other suitable tunable structures. During operation of device 10, control circuitry 28 may issue control signals on one or more control paths such as control path 62 that adjust inductance values, capacitance values, or other parameters associated with tunable components 64, thereby tuning antenna 40 to cover desired communications bands. Antenna tuning components that are used to adjust the frequency response of antenna 40 such as tunable components 64 may sometimes be referred to herein as antenna tuning components, tuning components, antenna tuning elements, tuning elements, adjustable tuning components, adjustable tuning elements, or adjustable components.

Radio-frequency transmission line path 50 may include one or more radio-frequency transmission lines. Radio-frequency transmission lines in radio-frequency transmission line path 50 may, for example, include coaxial cable transmission lines, stripline transmission lines, microstrip transmission lines, coaxial probes realized by a metalized vias, edge-coupled microstrip transmission lines, edge-coupled stripline transmission lines, waveguide structures (e.g., coplanar waveguides or grounded coplanar waveguides), combinations of these types of radio-frequency transmission lines and/or other transmission line structures, etc.

Radio-frequency transmission line path 50 may have a positive signal conductor such as signal conductor 52 and a ground signal conductor such as ground conductor 54. The radio-frequency transmission lines in radio-frequency transmission line path 50 may, for example, be integrated into rigid and/or flexible printed circuit boards. In one suitable arrangement, radio-frequency transmission lines in radio-frequency transmission line path 50 may also include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network (e.g., an adjustable matching network formed using tunable components 64) may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna 40 and may be tunable and/or fixed components.

Radio-frequency transmission line path 50 may be coupled to antenna feed structures associated with antenna 40. As an example, antenna 40 may form an inverted-F antenna, a slot antenna, a monopole antenna, a dipole antenna, or other antenna having an antenna feed 48 with a positive antenna feed terminal such as positive antenna feed terminal 56 and a ground antenna feed terminal such as ground antenna feed terminal 58. Signal conductor 52 may be coupled to positive antenna feed terminal 56 and ground conductor 54 may be coupled to ground antenna feed terminal 58. Other types of antenna feed arrangements may be used if desired. For example, antenna 40 may be fed using multiple feeds each coupled to a respective port of radio-frequency transceiver circuitry 60 over a corresponding radio-frequency transmission line path. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between radio-frequency transceiver circuitry 60 and the positive antenna feed terminals if desired (e.g., to selectively activate one or more positive antenna feed terminals at any given time). The illustrative feeding configuration of FIG. 3 is merely illustrative.

Control circuitry 28 may use information from a proximity sensor, wireless performance metric data such as received signal strength information, device orientation information from an orientation sensor, device motion data from an accelerometer or other motion detecting sensor, information about a usage scenario of device 10, information about whether audio is being played through speaker port 16 (FIG. 1), information from one or more antenna impedance sensors, information on desired frequency bands to use for communications, and/or other information in determining when antenna 40 is being affected by the presence of nearby external objects or is otherwise in need of tuning. In response, control circuitry 28 may adjust an adjustable inductor, adjustable capacitor, switch, or other tunable components such as tunable components 64 to ensure that antenna 40 operates as desired. Adjustments to tunable components 64 may also be made to extend the frequency coverage of antenna 40 (e.g., to cover desired communications bands that extend over a range of frequencies larger than antenna 40 would cover without tuning).

Antenna 40 may include antenna resonating element structures (sometimes referred to herein as radiating element structures), antenna ground plane structures (sometimes referred to herein as ground plane structures, ground structures, or antenna ground structures), an antenna feed such as antenna feed 48, and other components (e.g., tunable components 64). Antenna 40 may be configured to form any suitable type of antenna.

Figure 4:
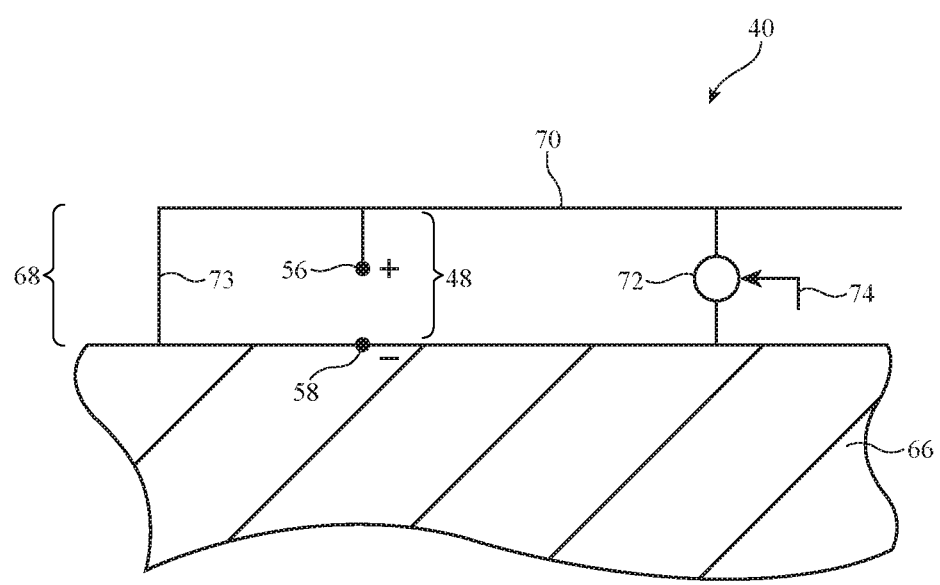
FIG. 4 is a diagram of an illustrative antenna having an antenna resonating element arm and an antenna ground in accordance with some embodiments.

FIG. 4 is a schematic diagram of antenna structures that may be used in forming antenna 40. As shown in FIG. 4, antenna 40 may include an antenna resonating element such as antenna resonating element 68 (e.g., an inverted-F antenna resonating element) and an antenna ground (sometimes referred to herein as a ground plane) such as antenna ground 66. Antenna resonating element 68 may have a main resonating element arm such as arm 70. The length of arm 70 may be selected so that antenna 40 resonates at desired operating frequencies (e.g., where the length of arm 70 is approximately equal to one-quarter of the effective wavelength corresponding to a frequency in a communications band handled by antenna 40). Antenna resonating element 68 may also exhibit resonances at harmonic frequencies.

If desired, other conductive structures in the vicinity of arm 70 may contribute to the radiative response of antenna 40 (e.g., antenna resonating element 68 may include conductive structures that are separate from arm 70 such as conductive portions of other antennas in the vicinity of antenna 40). Arm 70 may be separated from antenna ground 66 by a dielectric-filled opening or gap. Antenna ground 66 may be formed from housing structures such as a conductive support plate, conductive portions of display 14 (FIG. 1), conductive traces on a printed circuit board, metal portions of electronic components, or other conductive ground structures.

If desired, arm 70 may be coupled to antenna ground 66 by one or more return paths such as return path 73. Positive antenna feed terminal 56 of antenna feed 48 may be coupled to arm 70. Ground antenna feed terminal 58 may be coupled to antenna ground 66 (e.g., antenna feed 48 may run parallel to return path 73). If desired, antenna resonating element 68 may include more than one resonating arm to support radiation in multiple communications bands (e.g., antenna resonating element 68 may include one or more arms in addition to arm 70). Each arm may help to support radiation in one or more respective communications bands, for example. In one suitable arrangement that is sometimes described herein as an example, antenna resonating element 68 may include two arms extending from opposing sides of antenna feed 48 and/or return path 73. Antenna resonating element 68 may include one or more parasitic antenna resonating elements if desired. Arm 70 may have other shapes and may follow any desired path (e.g., paths having curved and/or straight segments).

If desired, antenna resonating element 68 may include one or more tunable components that are coupled between arm 70 and antenna ground 66. As shown in FIG. 4, for example, a tunable component such as tunable component 72 (e.g., a tunable component such as tunable component 64 of FIG. 3) may be coupled between arm 70 and antenna ground 66. Tunable component 72 may exhibit a capacitance, resistance, and/or inductance that is adjusted in response to control signals 74 provided to tunable component 72 from control circuitry 28 (FIG. 3).

Figure 5:
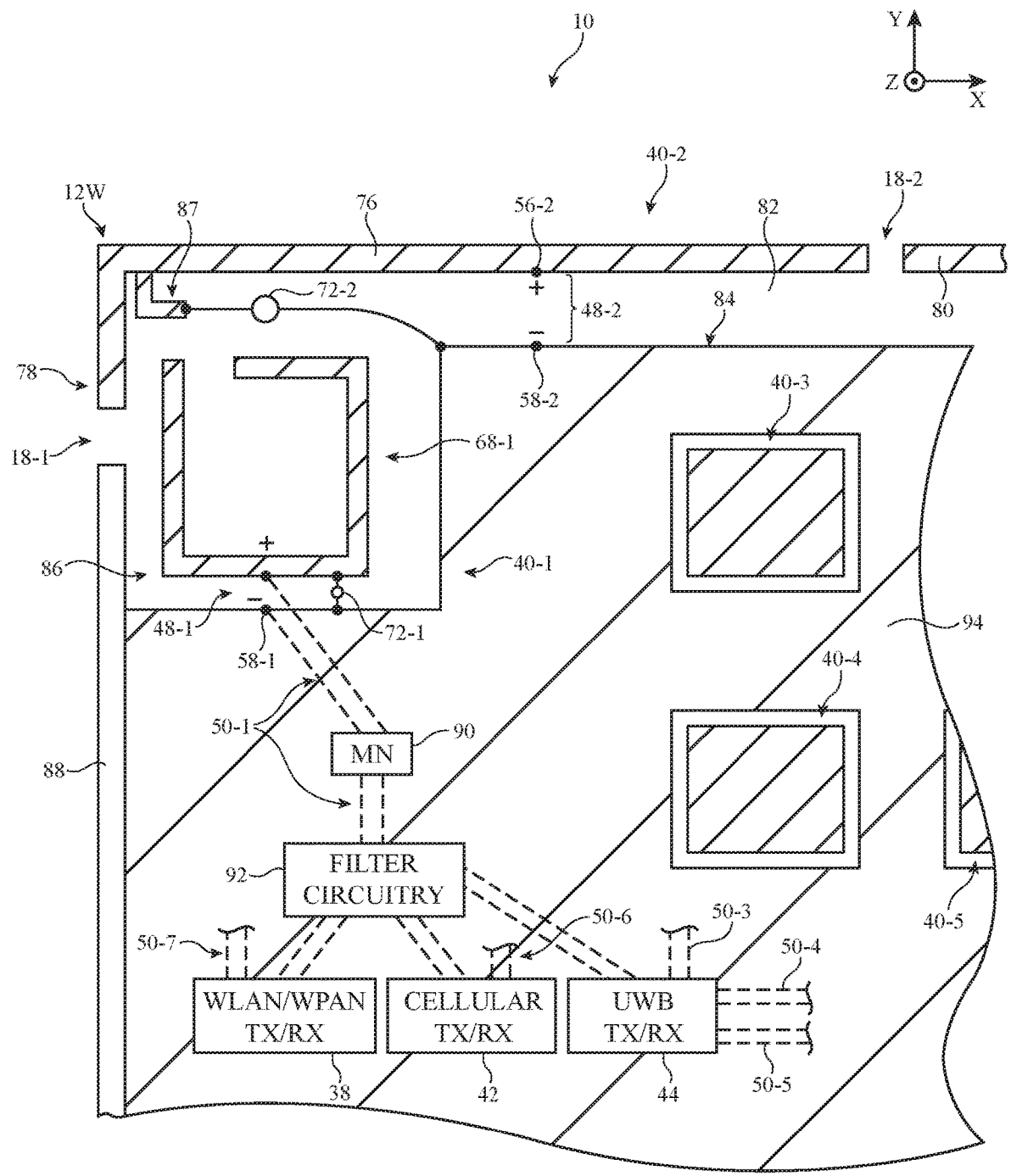
FIG. 5 is a top view of illustrative antenna structures for covering multiple frequency bands in an electronic device in accordance with some embodiments.

A top interior view of an illustrative portion of device 10 that contains multiple antennas 40 is shown in FIG. 5 (e.g., at the top-left corner of device 10 within region 20 of FIG. 1). As shown in FIG. 5, device 10 may have peripheral conductive housing structures such as peripheral conductive housing structures 12W. Peripheral conductive housing structures 12W may be divided by dielectric-filled peripheral gaps 18 (e.g., plastic gaps) such as gaps 18-1 and 18-2. Gap 18-1 may divide peripheral conductive housing structures 12W into a first segment 88 and a second segment 76. Gap 18-2 may separate second segment 76 from a third segment 80 of peripheral conductive housing structures 12W.

As shown in FIG. 5, device 10 may include at least two antennas 40 such as a first antenna 40-1 and a second antenna 40-2. Antenna 40-2 may have an antenna resonating element arm (e.g., arm 70 of FIG. 4) formed from segment 76 of peripheral conductive housing structures 12W. Ground structures 94 may form the antenna ground (e.g., antenna ground 66 of FIG. 4) for antenna 40-2. Antenna 40-2 may have an antenna feed 48-2 with a positive antenna feed terminal 56-2 coupled to segment 76 and a ground antenna feed terminal 58-2 coupled to ground structures 94.

Segments 76 and 80 of peripheral conductive housing structures 12W may be separated from ground structures 94 by dielectric-filled slot 82. Air, plastic, ceramic, glass, and/or other dielectric materials may fill slot 82. In one suitable arrangement, slot 82 may be continuous with gaps 18-1 and 18-2 and a single piece of dielectric material (e.g., plastic) may fill slot 82, gap 18-1, and gap 18-2. The length of segment 76 may be selected to provide antenna 40-2 with a response peak in one or more communications bands. The length of segment 76 from antenna feed 48-2 to tip (end) 78 of segment 76 and/or the length of segment 76 from antenna feed 48-2 to dielectric gap 18-2 may, for example, be approximately equal to one-quarter of an effective wavelength of operation of antenna 40-2 (e.g., where the effective wavelength is equal to the free space wavelength modified by a constant value determined by the dielectric material in slot 82).

Segment 76 may also have one or more harmonic modes that cover additional frequencies. Antenna 40-2 may also include a tunable component 72-2 (e.g., a tunable component such as tunable component 64 of FIG. 3) that is coupled between segment 76 and ground structures 94. In one suitable arrangement that is sometimes described herein as an example, tunable component 72-2 may be coupled to a conductive interconnect structure such as conductive clip 87 on segment 76. Tunable component 72-2 may also form a return path for antenna 40-2 (e.g., return path 73 of FIG. 4) if desired (e.g., depending on the state of the tunable component in scenarios where tunable component 72 is adjustable). Tunable component 72-2 may be adjusted to tune the frequency response of antenna 40-2. Slot 82 may, if desired, be a radiating slot having a perimeter that is selected to contribute to the radiative response of antenna 40-2 (e.g., antenna 40-2 may be a hybrid-inverted-F-slot antenna).

Ground structures 94 may have an upper edge 84 that is separated from segment 76 by slot 82. If desired, slot 82 may include an extended portion 86 that extends downwards beyond upper edge 84 (e.g., parallel to the Y-axis) and towards the bottom end of device 10. Extended portion 86 of slot 82 may extend beyond gap 18-1 or the bottom edge of extended portion 86 may be parallel with the bottom edge of gap 18-1. This example is merely illustrative and, in general, slot 82 and ground structures 94 may have any desired shapes (e.g., upper edge 84 of ground structures 94 may follow any desired straight and/or curved path).

Antenna 40-1 may have an antenna resonating element 68-1 that overlaps slot 82 (e.g., extended portion 86 of slot 82). Antenna resonating element 68-1 may include one or more arms (e.g., arm 70 of FIG. 4). Antenna 40-1 may be fed using antenna feed 48-1 coupled between antenna resonating element 68-1 and ground structures 94 (e.g., antenna feed 48-1 may include positive antenna feed terminal 56-1 coupled to antenna resonating element 68-1 and ground antenna feed terminal 58-1 coupled to ground structures 94). Ground structures 94 may form part of the antenna ground for antenna 40-1 (e.g., antenna ground 66 of FIG. 4). Antenna 40-1 may include one or more tunable components such as tunable component 72-1 (e.g., a tunable component such as tunable component 64 of FIG. 3) coupled between antenna resonating element 68-1 and ground structures 94. If desired, antenna currents induced on the return path for antenna 40-2 (e.g., on tunable component 72-2), conductive clip 87, and/or on segment 76 (e.g., at or adjacent to tip 78) may also contribute to the radiative response of antenna 40-1 (e.g., segment 76, conductive clip 87, and/or tunable component 72-2 may form part of antenna 40-1).

Ground structures 94 may be formed from conductive housing structures, from electrical device components in device 10, from printed circuit board traces, from strips of conductor such as strips of wire and metal foil, from conductive portions of display 14 (FIG. 1), and/or other conductive structures. In one suitable arrangement, ground structures 94 may include conductive portions of housing 12 (e.g., portions of rear housing wall 12R of FIG. 1 and/or portions of a different conductive support plate in device 10) and conductive portions of display 14 (FIG. 1). Segment 88 of peripheral conductive housing structures 12W may be coupled to ground structures 94 and may therefore form part of the antenna ground for antenna 40-1 and/or antenna 40-2. Segment 88 and ground structures 94 may be formed from a single integral piece of metal if desired.

Device 10 may include additional antennas such as antennas 40-3, 40-4, and 40-5 that are aligned with respective openings in ground structures 94. Antennas 40-3, 40-4, and 40-5 may, for example, be used to transmit and receive UWB signals through the rear face of device 10 (e.g., through rear housing wall 12R of FIG. 1). Antennas 40-3, 40-4, and 40-5 may, for example, form a triplet of antennas that can receive UWB signals that are processed by control circuitry 28 (FIG. 2) to determine a three-dimensional angle-of-arrival of the received UWB signals.

In one suitable arrangement that is sometimes described herein as an example, antennas 40-1, 40-3, 40-4, and 40-5 are each mounted to the same dielectric substrate (e.g., to the same rigid or flexible printed circuit board). Tunable components 72-2 and 72-1 (sometimes referred to herein as tuning components 72-1 and 72-2 or antenna tuning components 72-1 and 72-2) may also be mounted to the dielectric substrate. As an example, antenna resonating element 68-1 may be formed from conductive traces patterned on the dielectric substrate. The dielectric substrate may press antennas 40-3, 40-4, and 40-5 against the rear housing wall of device 10 (e.g., rear housing wall 12R of FIG. 1). If desired, the dielectric substrate may press antenna 40-1 against slot 82 and/or the rear housing wall of device 10. The radio-frequency transmission line paths used to feed antennas 40-1, 40-3, 40-4, and 40-5 may be formed from conductive traces (e.g., conductive traces that form stripline transmission lines or other radio-frequency transmission lines) on the dielectric substrate, for example.

Conductive structures over antennas 40-3, 40-4, and 40-5 (e.g., display 14 of FIG. 1, a battery for device 10, etc.) may effectively block antennas 40-3, 40-4, and 40-5 from transmitting or receiving UWB signals through the front face of device 10 (e.g., in the +Z direction). In order to help provide UWB coverage through the front face of device 10 (e.g., to provide a full sphere of UWB coverage around all sides of device 10), antenna 40-1 may also be used to transmit and/or receive UWB signals. Because antenna 40-1 is located at the corner of device 10, antenna 40-1 may be at least partially aligned with the inactive area of the display at the front face of device 10 (e.g., inactive area IA of display 14 of FIG. 1). This may allow antenna 40-1 to transmit and/or receive UWB signals through the front face of device 10 without the signals being blocked by conductive structures in display 14 (e.g., pixel circuitry or other components associated with active area AA of FIG. 1). Antenna currents induced on peripheral conductive housing structures 12W by antenna resonating element 68-1 may also help to ensure that antenna 40-1 can convey radio-frequency signals through the front face of device 10. Antenna 40-1 may also convey UWB signals through the rear face of device 10 (e.g., through slot 82 in the −Z direction) and laterally through gap 18-1 in peripheral conductive housing structures 12W.

Antenna 40-1 may be used to transmit UWB signals for use by external communications equipment (e.g., external communications equipment 10' of FIG. 2) in determining an angle of arrival of the transmitted UWB signals and/or a distance between the external communications equipment and device 10. If desired, antenna 40-1 may also be used to receive UWB signals from external communications equipment (e.g., external communications equipment 10' of FIG. 2) for use in determining the distance between the external communications equipment and device 10.

Antenna 40-1 may concurrently convey UWB signals in multiple UWB communications bands. For example, antenna 40-1 may convey UWB signals in a first UWB communications band between about 6250 MHz and 6750 MHz (e.g., UWB Channel 5) and a second UWB communications band between about 7350 MHz and 8250 MHz (e.g., UWB Channel 9). Antenna 40-1 may exhibit sufficient bandwidth to cover both the first and second UWB communications bands without the need to adjust a tuning circuit (e.g., tunable component 72-1) to tune antenna 40-1 between the first and second UWB communications bands.

If desired, antenna 40-1 may also be used to convey non-UWB signals in one or more other communications bands in addition to conveying UWB signals. In one suitable arrangement that is sometimes described herein as an example, antenna 40-1 may convey non-UWB signals in first and second communications bands such as a 5.0 GHz WLAN communications band (e.g., a frequency band from about 5180 MHz to about 5850 MHz) and one or more cellular ultra-high bands at frequencies between about 3400 MHz and 3700 MHz. Examples of cellular ultra-high bands that may be covered by antenna 40-1 include Long Term Evolution (LTE) band B42 (e.g., between about 3.4 GHz and 3.6 GHz) and LTE band B48 (e.g., between about 3.6 GHz and 3.7 GHz). Tunable component 72-1 and/or tunable component 72-2 may tweak the frequency response of antenna 40-1 in one or more of these communications bands.

As shown in FIG. 5, radio-frequency transmission line path 50-1 may couple antenna feed 48-1 on antenna 40-1 to WLAN/WPAN transceiver circuitry 38, cellular telephone transceiver circuitry 42, and UWB transceiver circuitry 44. Impedance matching circuitry such as impedance matching network (MN) 90 may be interposed on radio-frequency transmission line path 50-1 for matching the impedance of radio-frequency transmission line path 50-1 to the impedance of antenna resonating element 68-1 and/or for tuning the frequency response of antenna 40-1.

WLAN/WPAN transceiver circuitry 38 may convey (non-UWB) radio-frequency signals in a WLAN or WPAN communications band such as the 5.0 GHz WLAN band over antenna feed 48-1. Cellular telephone transceiver circuitry 42 may convey (non-UWB) radio-frequency signals in one or more cellular telephone communications bands such as one or more ultra-high bands over antenna feed 48-1. UWB transceiver circuitry 44 may convey UWB signals in one or more UWB communications bands over antenna feed 48-1. Antenna 40-1 may concurrently convey one or more (e.g., all) of these signals at any given time with satisfactory antenna efficiency.

Filter circuitry such as filter circuitry 92 may be interposed on radio-frequency transmission line path 50-1 to help isolate the signals conveyed by transceiver circuitry 38, 42, and 44 (e.g., to prevent UWB signals from passing to transceiver circuitry 38 and 42, to prevent non-UWB signals from passing to UWB transceiver circuitry 44, to prevent non-UWB signals in a WLAN communications band from passing to cellular telephone transceiver circuitry 42, etc.). Filter circuitry 92 may include passive filter circuitry such as a duplexer, diplexer, triplexer, low pass filter, band pass filter, band stop filter, high pass filter, and/or other filter circuitry that helps to isolate the signals conveyed by transceiver circuitry 38, 42, and 44. If desired, filter circuitry 92 may also include active circuitry such as switching circuitry that selectively couples one or more of transceiver circuitry 38, 42, and 44 to antenna feed 48-1 at any given time.

As shown in FIG. 5, UWB transceiver circuitry 44 may be coupled to antenna 40-3 via radio-frequency transmission line path 50-3, may be coupled to antenna 40-4 via radio-frequency transmission line path 50-4, and may be coupled to antenna 40-5 via radio-frequency transmission line path 50-5. Cellular telephone transceiver circuitry 42 may be coupled antenna feed 48-2 of antenna 40-2 via radio-frequency transmission line path 50-6. If desired, WLAN/WPAN transceiver circuitry 38 may be coupled to antenna feed 48-2 via radio-frequency transmission line path 50-7 (e.g., in scenarios where antenna 40-2 also conveys radio-frequency signals in one or more WLAN or WPAN communications bands). GPS receiver circuitry such as GPS receiver circuitry 36 of FIG. 2 may also be couple to antenna feed 48-2 if desired (e.g., in scenarios where antenna 40-2 also receives radio-frequency signals in a satellite navigation communications band). Transceiver circuitry 38, 42, and 44 may each be mounted to the same substrate (e.g., a main logic board for device 10 that is separate from the dielectric substrate used to support antennas 40-1, 40-3, 40-4, and 40-5).

Figure 6:
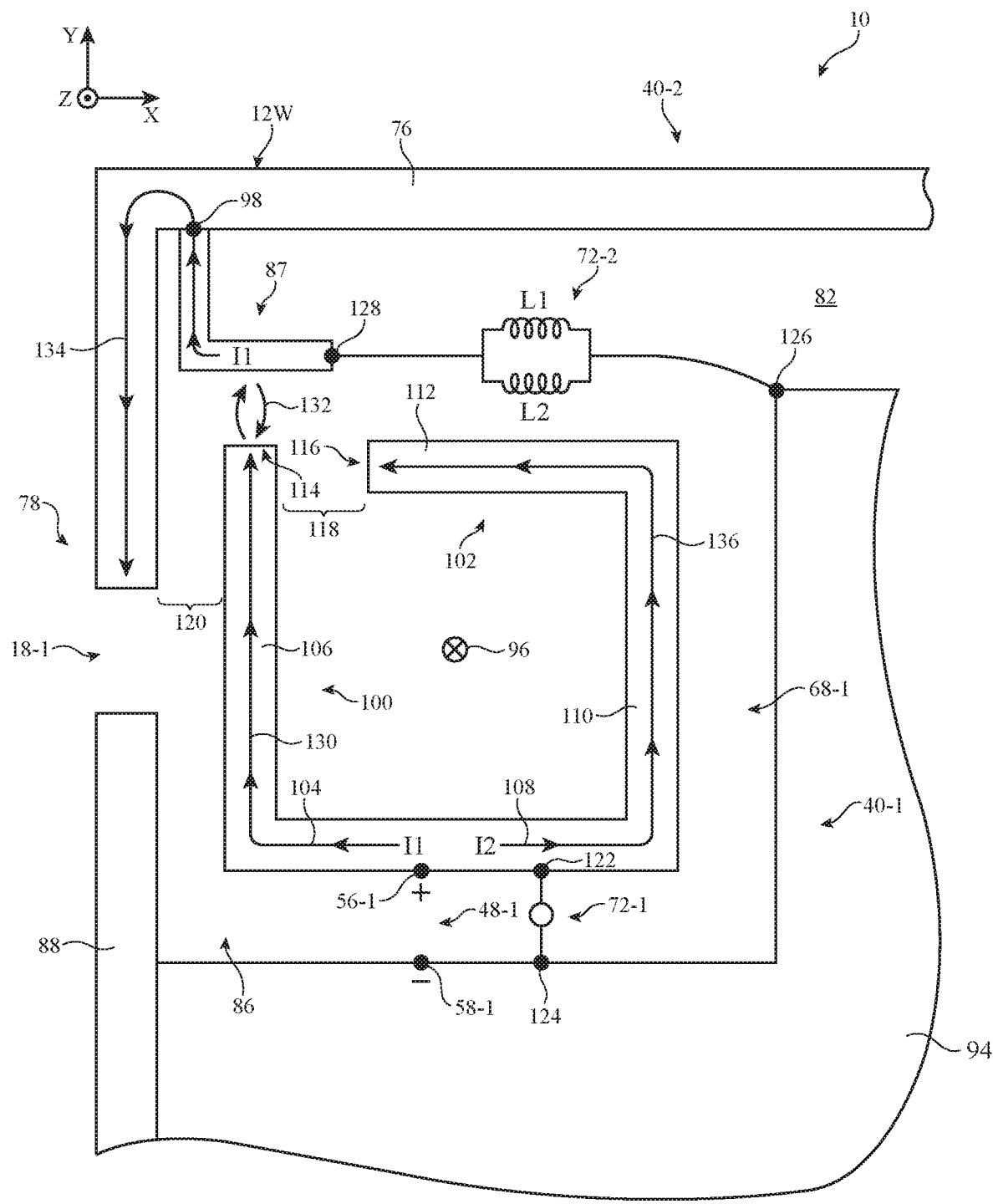
FIG. 6 is a top view of an illustrative antenna for covering multiple frequency bands within a confined volume in accordance with some embodiments.

FIG. 6 is a top view showing how antenna 40-1 may be used to convey non-UWB signals in a WLAN communications band and one or more cellular telephone communications bands. As shown in FIG. 6, antenna resonating element 68-1 of antenna 40-1 may include a first arm 100 and a second arm 102 (e.g., arms such as arm 70 of FIG. 4) extending from opposing sides of antenna feed 48-1. Locating first arm 100 and/or second arm 102 at or adjacent to (e.g., at least partially aligned with) gap 18-1 may allow antenna 40-1 to radiate in a lateral direction through gap 18-1 (e.g., to provide antenna 40-1 with a close to omnidirectional radiation pattern). First arm 100 and second arm 102 may, for example, be formed from conductive traces patterned on a dielectric substrate or from any other desired conductive material on any other desired substrate (e.g., metal foil, conductive housing portions, etc.).

First arm 100 may have a first segment (portion) 104 extending from positive antenna feed terminal 56-1 and a second segment 106 extending at a non-parallel angle (e.g., a perpendicular angle) from the end of first segment 104. The end 114 of second segment 106 may overlap segment 76 of peripheral conductive housing structures 12W or may be aligned with one of the edges of gap 18-1 if desired. Second segment 106 may be separated from tip 78 of segment 76 by gap 120. Second segment 106 may also be separated from conductive clip 87 by a portion of slot 82.

Conductive clip 87 may be used to help secure tunable component 72-2 of antenna 40-2 to peripheral conductive housing structures 12W. For example, tunable component 72-2 may have a first (ground) terminal 126 coupled to ground structures 94 and a second terminal 128 coupled to conductive clip 87. Conductive clip 87 may have a terminal 98 coupled to segment 76. Terminal 98 may include a conductive screw, a conductive screw boss on segment 76, a conductive pin, solder, welds, conductive adhesive, a conductive spring, and/or any other desired conductive interconnect structures that secure and electrically connect conductive clip 87 to segment 76. Terminal 128 may include solder, welds, conductive adhesive, a conductive screw, a conductive screw boss, a conductive spring, and/or any other desired conductive interconnect structures.

Conductive clip 87 may, for example, help to mechanically secure a dielectric substrate (e.g., a flexible printed circuit) that supports tunable components 72-1 and 72-2 and antenna resonating element 68-1 to peripheral conductive housing structures 12W. In another suitable arrangement, conductive clip 87 may be formed from an integral portion of segment 76 (e.g., a protruding lip or ledge of peripheral conductive housing structures 12W). In yet another suitable arrangement, conductive clip 87 may be omitted and terminal 128 of tunable component 72-2 may be directly connected to segment 76. Conductive clip 87 need not be a clip and, in another suitable arrangement, may be replaced with a conductive bracket (e.g., a conductive bracket coupled to segment 76 at terminal 98 and coupled to terminal 128 of tunable component 72-2).

As shown in FIG. 6, tunable component 72-2 may include inductors such as a first inductor L1 and a second inductor L2 coupled in series between terminals 128 and 126. Inductors L1 and L2 may be fixed inductors or may be switchable (adjustable) inductors. The example of FIG. 6 is merely illustrative and, in general, tunable component 72-2 may include any desired number of capacitive, inductive, resistive, and/or switching components arranged in any desired manner between terminals 128 and 126. Tunable component 72-2 may be used to help tune the frequency response of antenna 40-2.

Second arm 102 of antenna 40-1 may laterally extend (wrap) around vertical axis 96, such that first arm 100 and second arm 102 collectively extend around vertical axis 96 (e.g., an axis extending through slot 82 parallel to the Z-axis). For example, second arm 102 may include a first segment (portion) 108 extending from positive antenna feed terminal 56-1 and the end of first segment 104 of first arm 100. Second arm 102 may include a second segment 110 having a first end extending at a non-parallel angle (e.g., a perpendicular angle) from the end of first segment 108.

Second segment 110 of second arm 102 may, for example, extend parallel to second segment 106 of first arm 100. Second arm 102 may also include a third segment 112 extending at a non-parallel angle (e.g., a perpendicular angle) from the second end of second segment 110. Third segment 112 of second arm 102 may, for example, extend parallel to first segment 104 of first arm 100 and first segment 108 of second arm 102. The end (tip) 116 of second arm 102 (e.g., third segment 112 of second arm 102) may be separated from second segment 106 of first arm 100 by gap 118. The upper edge of third segment 112 may be aligned with end 114 of first arm 100 if desired.

The length of first arm 100, conductive clip 87, and tip 78 of segment 76 (e.g., the length of peripheral conductive housing structures 12W extending from terminal 98 to gap 18-1) may be selected to support resonances for antenna 40-1 in one or more cellular telephone communications bands such as one or more ultra-high bands between 3400 MHz and 3700 MHz. Antenna feed 48-1 may convey radio-frequency signals in the cellular telephone communications band(s) for cellular telephone transceiver circuitry 42 (FIG. 5). Corresponding antenna currents I1 (e.g., antenna currents in the cellular telephone communications band(s)) may flow on first arm 100, as shown by arrow 130. The antenna currents I1 on second segment 106 of first arm 100 may induce antenna currents I1 to flow on clip 87 and tip 78 of peripheral conductive housing structures 12W, as shown by arrow 134, via near-field electromagnetic coupling 132.

In this way, first arm 100, conductive clip 87, and the portion (length) of segment 76 extending from clip 87 to gap 18-1 may be configured to radiate in the cellular telephone communications band(s) (e.g., the total length of arrows 130 and 134 may be approximately equal to one quarter of an effective wavelength corresponding to a frequency in the cellular telephone communications band(s), where the effective wavelength is modified from a free space wavelength by a constant factor based on the dielectric properties of the materials surrounding antenna 40-1). If desired, tunable component 72-2 (e.g., inductors L1 and L2) may also help to tune the frequency response of antenna 40-1 (e.g., the frequency response of first arm 100, conductive clip 87, and tip 78 of peripheral conductive housing structures 12W) in the cellular telephone communications band(s) (e.g., in addition to tuning the frequency response of antenna 40-2).

The length of second arm 102 may be selected to radiate in a WLAN communications band such as a 5.0 GHz WLAN communications band (e.g., in a fundamental mode of second arm 102). Antenna feed 48-1 may convey radio-frequency signals in the WLAN communications band for WLAN/WPAN transceiver circuitry 38 (FIG. 5). Corresponding antenna currents I2 (e.g., antenna currents in the WLAN communications band) may flow on second arm 102 (e.g., between positive antenna feed terminal 56-1 and end 116), as shown by arrow 136. Antenna currents I2 on second arm 102 may radiate the radio-frequency signals in the WLAN communications band.

In this way, second arm 102 may be configured to radiate in the WLAN communications band (e.g., where the total length of arrow 136 is approximately equal to one quarter of an effective wavelength corresponding to a frequency in the WLAN communications band). Because the current path in the WLAN communications band (e.g., arrow 136) is shorter than the current path in the cellular telephone communications band(s) (e.g., arrows 130 and 134), second arm 102 may support a fundamental mode resonance at higher frequencies than first arm 100, conductive clip 87, and tip 78 of peripheral conductive housing structures 12W. If desired, tunable component 72-1 may also help to tune the frequency response of antenna 40-1 (e.g., the frequency response of second arm 102) in the WLAN communications band. Tunable component 72-1 may, for example, have at least one terminal 122 coupled to second arm 102 and at least one terminal 124 coupled to ground structures 94.

In this way, antenna 40-1 may concurrently cover both the WLAN communications band and the cellular telephone communications band(s) with satisfactory antenna efficiency. The example of FIG. 6 is merely illustrative. In general, second arm 102 and first arm 100 may have other shapes (e.g., shapes following any curved and/or straight paths and having any desired number of curved and/or straight edges). In another suitable arrangement, tunable component 72-1 may be coupled between second segment 110 of second arm 102 and ground structures 94.

If desired, ground structures 94 may include multiple conductive structures such as one or more conductive layers within device 10. For example, ground structures 94 may include a first conductive layer formed from a portion of housing 12 (e.g., a conductive backplate that forms part of rear housing wall 12R of FIG. 1) and a second conductive layer formed from a conductive display frame or support plate associated with display 14 (FIG. 1). In these scenarios, conductive interconnect structures (e.g., a conductive screw, conductive bracket, conductive clip, conductive pin, conductive spring, solder, solder, welds, conductive adhesive, a conductive screw boss, etc.) may electrically connect terminals 58-1, 124, and/or 126 to both the conductive display layer and the conductive housing layer. This may allow ground structures 94 to extend across both conductive portions of housing 12 and display 14 (FIG. 1) so that the conductive material closest to antennas 40-1 and 40-2 are held at a ground potential. This may, for example, serve to maximize the antenna efficiency of antenna 40-1 and/or antenna 40-2 within the communications bands that are covered by antennas 40-1 and 40-2.

Figure 7:
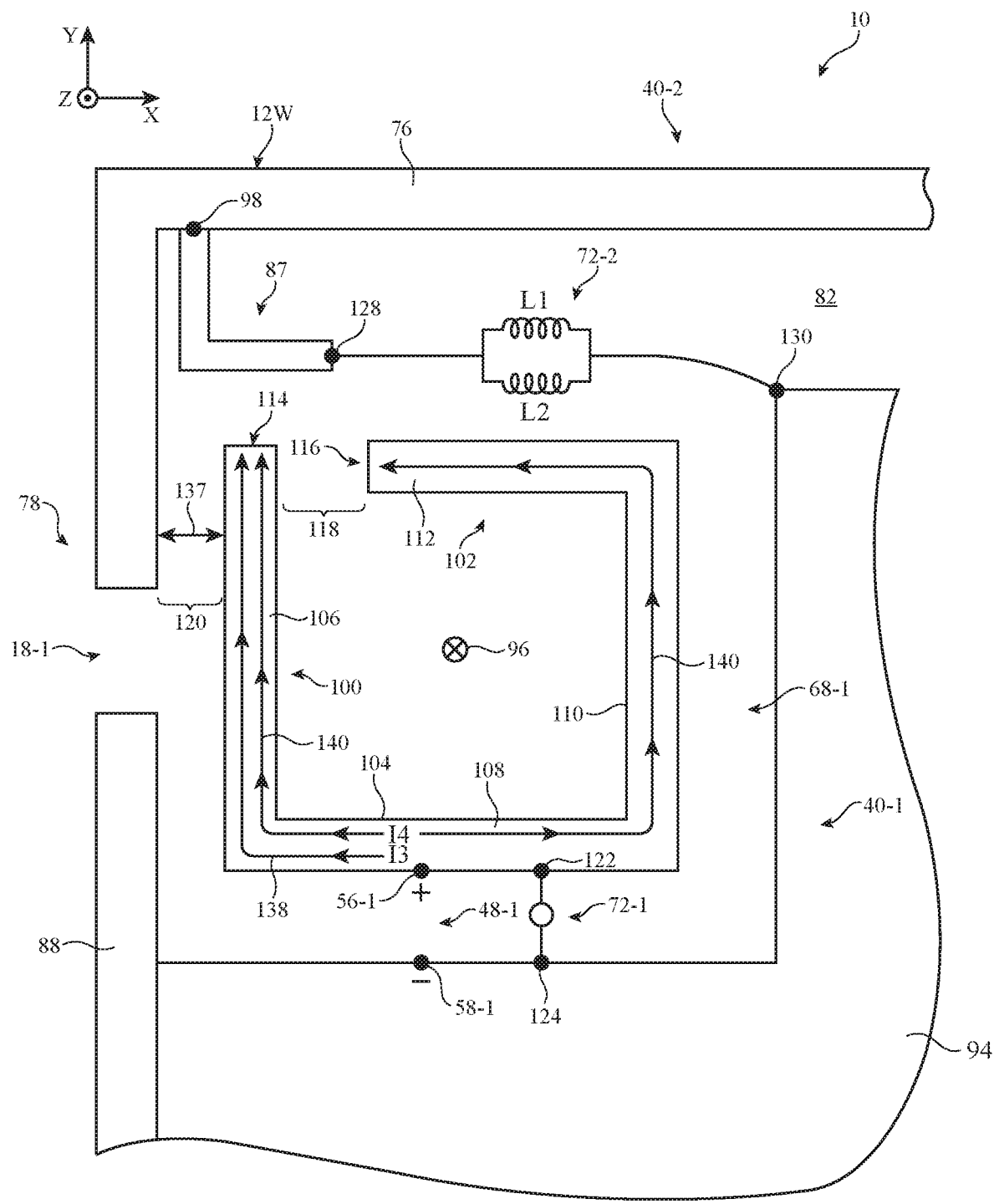
FIG. 7 is a top view showing how an illustrative antenna of the type shown in FIG. 6 may concurrently convey antenna currents in first and second ultra-wideband communications bands in accordance with some embodiments.

Antenna 40-1 may also convey UWB signals in one or more (e.g., two) UWB communications bands such as a first UWB communications band at 6.5 GHz and a second UWB communications band at 8.0 GHz. FIG. 7 is a top view showing how antenna 40-1 may be used to convey radio-frequency signals (UWB signals) in the first UWB communications band at 6.5 GHz and the second UWB communications band at 8.0 GHz.

As shown in FIG. 7, first arm 100 may exhibit a fundamental mode resonance in the first UWB communications band at 6.5 GHz (e.g., while first arm 100 concurrently covers one or more cellular telephone communications bands as shown by current I1 of FIG. 6). For example, the length of first arm 100 may be approximately one-quarter of an effective wavelength corresponding to a frequency in the first UWB communications band. If desired, the length 137 of gap 120 between tip 78 and second segment 106 of first arm 100 may be selected to tweak the capacitance between tip 78 and second segment 106 and thus the frequency response of first arm 100 in the first UWB communications band (e.g., gap 120 may establish a distributed capacitance along first arm 100 that helps tune the frequency response of first arm 100).

Antenna feed 48-1 may convey radio-frequency signals in the first UWB communications band for UWB transceiver circuitry 44 (FIG. 5). Corresponding antenna currents I3 (e.g., antenna currents in the first UWB communications band at 6.5 GHz) may flow on first arm 100 (e.g., between positive antenna feed terminal 56-1 and end 114), as shown by arrow 138. Antenna currents I3 may radiate the radio-frequency signals in the first UWB communications band (e.g., first arm 100 may form a monopole antenna resonating element having a fundamental mode that radiates in the first UWB communications band).

First arm 100 and second arm 102 may exhibit harmonic mode resonances in the second UWB communications band at 8.0 GHz (e.g., while the fundamental mode of first arm 100 concurrently covers the first UWB communications band at 6.5 GHz and while the fundamental mode of second arm 102 concurrently covers the WLAN communications band). Antenna feed 48-1 may convey radio-frequency signals in the second ultra-wideband communications band for UWB transceiver circuitry 44 (FIG. 5). Corresponding antenna currents I4 (e.g., antenna currents in the second UWB communications band at 8.0 GHz) may flow on first arm 100, as shown by arrow 138, and may flow on second arm 102, as shown by arrow 140. In this way, first arm 100 and second arm 102 may each operate as monopole antenna resonating elements having harmonic modes that radiate in the second UWB communications band at 8.0 GHz. If desired, tunable component 72-1 may also help to tune the frequency response of antenna 40-1 (e.g., the frequency response of first arm 100 and/or second arm 102) in the first and/or second UWB communications bands.

In this way, antenna 40-1 may concurrently convey non-UWB signals in cellular telephone communications bands such as one or more cellular ultra-high bands (e.g., using antenna current I1 on first arm 100, conductive clip 87, and tip 78 of peripheral conductive housing structures 12W as shown in FIG. 6), in a WLAN communications band such as the 5.0 GHz WLAN communications band (e.g., using antenna current I2 on second arm 102 and the fundamental mode of second arm 102 as shown in FIG. 6), in a first UWB communications band such as the 6.5 GHz UWB communications band (e.g., using antenna current I3 on first arm 100 and the fundamental mode of first arm 100), and in a second UWB communications band such as the 8.0 GHz UWB communications band (e.g., using antenna current I4 on arms 100 and 102 and harmonic modes of arms 100 and 102). Antenna 40-1 may transmit and/or receive each of these signals through slot 82 and the rear face of device 10 (e.g., through rear housing wall 12R of FIG. 1 and in the −Z direction), through the front face of device 10 (e.g., through inactive area IA of display 14 of FIG. 1 and in the +Z direction), and/or laterally through gap 18-1. Antenna 40-1 may exhibit sufficient bandwidth to concurrently cover each of these communications bands without needing to adjust switching circuitry in a tunable component to switch between two or more of the communications bands.

Figure 8:
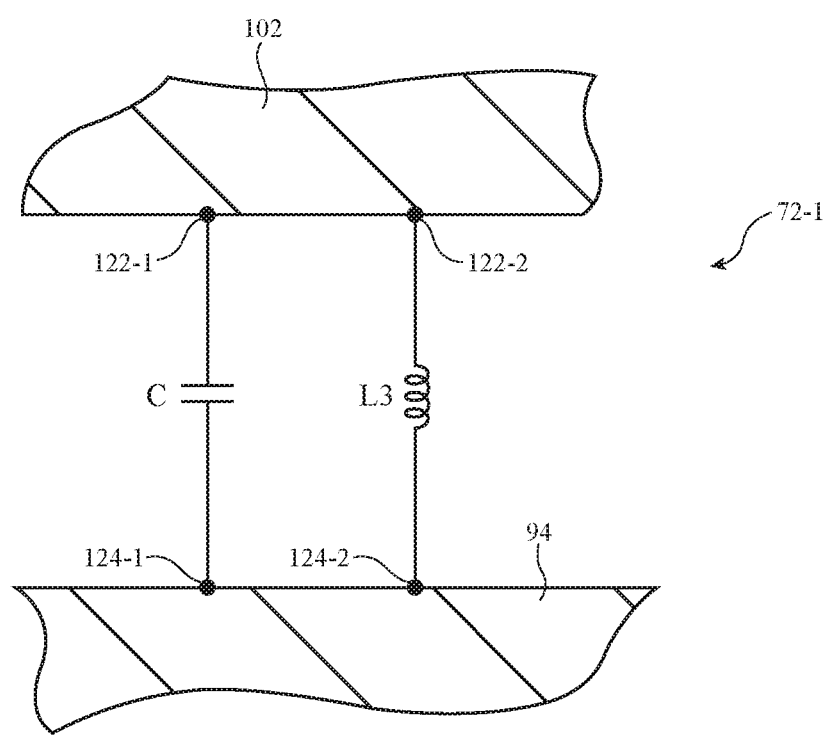
FIG. 8 is a circuit diagram of an illustrative tuning component that may be integrated within an antenna of the type shown in FIGS. 6 and 7 in accordance with some embodiments.

FIG. 8 is a circuit diagram of tunable component 72-1 in one suitable arrangement. As shown in FIG. 8, tunable component 72-1 may include a capacitor such as capacitor C and an inductor such as inductor L3 coupled in parallel between second arm 102 and ground structures 94 (e.g., capacitor C may have a first terminal 122-1 coupled to second arm 102 and a second terminal 124-1 coupled to ground structures 94 whereas inductor L3 has a first terminal 122-2 coupled to second arm 102 and a second terminal 124-2 coupled to ground structures 94). The capacitance of capacitor C and the inductance of inductor L3 may be selected to tune the frequency response of antenna 40-1 in one or more of the communications bands handled by antenna 40-1. Capacitor C may be a fixed capacitor or an adjustable capacitor (e.g., a switched capacitor). Inductor L3 may be a fixed inductor or an adjustable inductor (e.g., a switched inductor). The example of FIG. 8 is merely illustrative. In general, tunable component 72-1 may include any desired inductive, resistive, capacitive, and/or switching components coupled in any desired manner between second arm 102 and ground structures 94.

Figure 9:
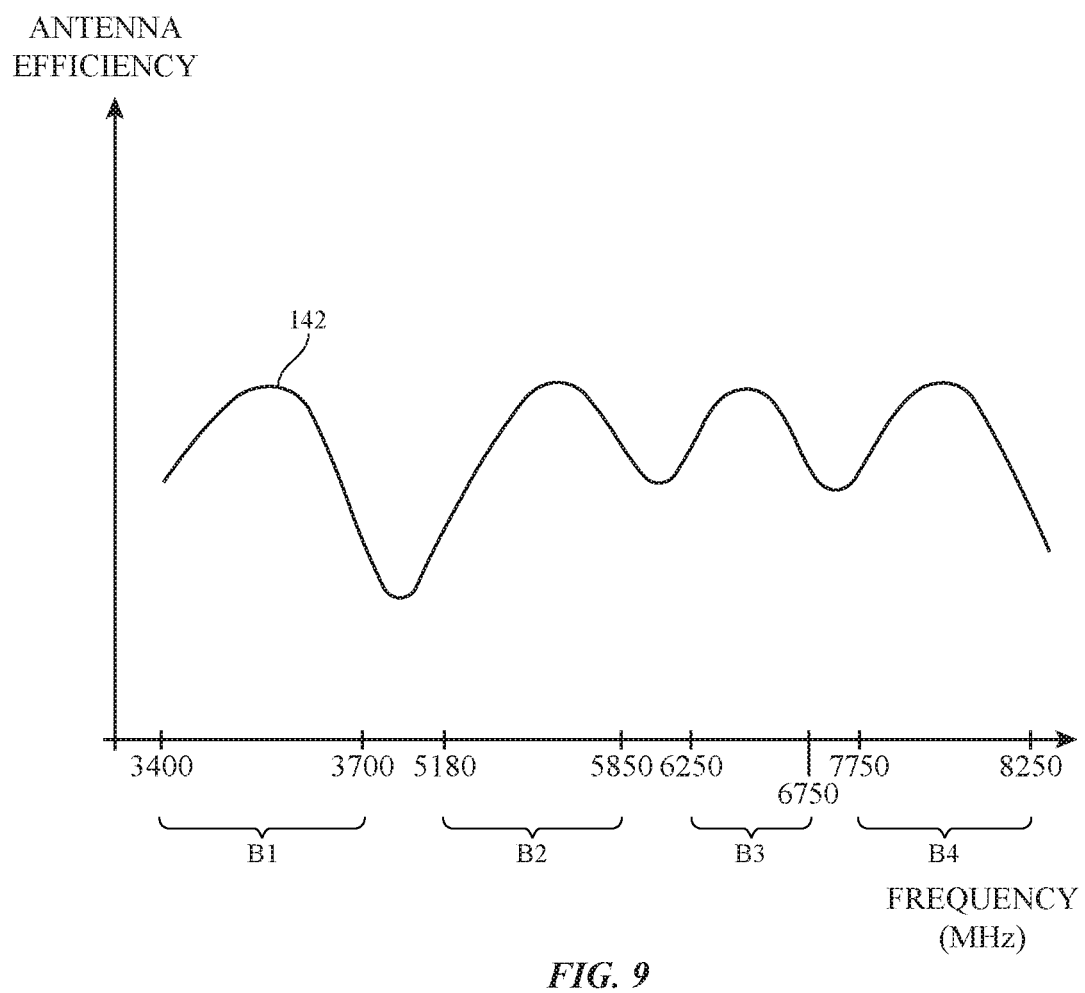
FIG. 9 is a plot of antenna performance (antenna efficiency) as a function of frequency for an illustrative antenna of the type shown in FIGS. 6 and 7 in accordance with some embodiments.

Curve 142 of FIG. 9 plots the antenna efficiency as a function of frequency for antenna 40-1 of FIGS. 6 and 7. As shown by curve 142, antenna 40-1 may exhibit a first response peak in a first communications band B1 (e.g., one or more cellular ultra-high bands between 3400 MHz and 3700 MHz). The first response peak may, for example, be supported by antenna currents I1 of FIG. 6. Antenna 40-1 may also exhibit a second response peak in a second communications band B2 (e.g., a 5.0 GHz WLAN communications band between 5180 MHz and 5850 MHz). The second response peak may, for example, be supported by antenna currents I2 of FIG. 6 and the fundamental mode of second arm 102.

Antenna 40-1 may exhibit a third response peak in communications band B3 (e.g., the first UWB communications band at 6.0 GHz, which includes frequencies between 6250 MHz and 6750 MHz). The third response peak may by supported by antenna currents I3 of FIG. 7 and the fundamental mode of first arm 100. Antenna 40-1 may also exhibit a fourth response peak in communications band B4 (e.g., the second UWB communications band at 8.0 GHz, which includes frequencies between 7750 MHz and 8250 MHz). The fourth response peak may by supported by antenna currents I4 of FIG. 7 and a harmonic mode (e.g., a first harmonic, second harmonic, third harmonic, etc.) of arms 100 and 102. The example of FIG. 9 is merely illustrative. In general, curve 142 may exhibit any desired number of response peaks of any desired shape at any desired frequencies.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   peripheral conductive housing structures;
   an antenna having an antenna ground and an antenna feed with first and second antenna feed terminals, wherein the first antenna feed terminal is coupled to the antenna ground, the antenna having first and second resonating element arms extending from opposing sides of the second antenna feed terminal;
   a first radio-frequency transceiver coupled to the antenna feed and configured to convey, using the antenna, first non-ultra-wideband signals in a first communications band, wherein the first resonating element arm and a portion of the peripheral conductive housing structures are configured to radiate in the first communications band;
   a second radio-frequency transceiver coupled to the antenna feed and configured to convey, using the antenna, second non-ultra-wideband signals in a second communications band that is higher than the first communications band, wherein the second resonating element arm is configured to radiate in the second communications band; and
   a third radio-frequency transceiver coupled to the antenna feed and configured to convey, using the antenna, ultra-wideband signals in an ultra-wideband communications band that is higher than the second communications band, wherein the first resonating element arm has a fundamental mode configured to radiate in the ultra-wideband communications band.

2. The electronic device defined in claim 1, wherein the second resonating element arm has a fundamental mode configured to radiate in the second communications band.

3. The electronic device defined in claim 2, wherein the first communications band comprises a first frequency between 3400 MHz and 3700 MHz and the second communications band comprises a second frequency between 5180 MHz and 5850 MHZ.

4. The electronic device defined in claim 3, wherein the ultra-wideband communications band comprises a third frequency between 6250 MHz and 6750 MHz.

5. The electronic device defined in claim 2, wherein the third radio-frequency transceiver is configured to convey, using the antenna, additional ultra-wideband signals in an additional ultra-wideband communications band that is higher than the ultra-wideband communications band, the first and second resonating element arms being configured to radiate in the additional ultra-wideband communications band.

6. The electronic device defined in claim 5, wherein the first resonating element arm has a harmonic mode configured to radiate in the additional ultra-wideband communications band and the second resonating element arm has a harmonic mode configured to radiate in the additional ultra-wideband communications band.

7. The electronic device defined in claim 6, wherein the ultra-wideband communications band comprises a first frequency between 6250 MHz and 6750 MHz and the additional ultra-wideband communications band comprises a second frequency between 7750 MHz and 8250 MHz.

8. The electronic device defined in claim 1, further comprising:
    ground structures that form the antenna ground, wherein the ground structures are separated from the peripheral conductive housing structures by a slot, and the first and second resonating element arms of the antenna overlap the slot; and
    an additional antenna having a third resonating element arm that includes the portion of the peripheral conductive housing structures, an additional antenna feed coupled to the portion of the peripheral conductive housing structures, and a tuning component coupled between the portion of the peripheral conductive housing structures and the ground structures, wherein the first radio-frequency transceiver is coupled to the additional antenna feed and configured to convey, using the additional antenna, third non-ultra-wideband signals in a third communications band that is lower than the first communications band, the third resonating element arm being configured to radiate in the third communications band.

9. The electronic device defined in claim 8, further comprising:
    a conductive clip that couples the tuning component to the portion of the peripheral conductive housing structures, wherein antenna currents in the first communications band and flowing on the first resonating element arm are configured to induce, via near-field electromagnetic coupling, additional antenna currents in the first communications band to flow on the conductive clip and the portion of the peripheral conductive housing structures.

10. The electronic device defined in claim 9, wherein the conductive clip is screwed to the portion of the peripheral conductive housing structures using a conductive screw.

11. The electronic device defined in claim 8, wherein the tuning component is configured to tune a frequency response of the additional antenna in the third communications band and is configured to tune a frequency response of the antenna in the first communications band.

12. The electronic device defined in claim 8, wherein the electronic device has a front face and a rear face, the electronic device further comprising:
    a display at the front face and mounted to the peripheral conductive housing structures;
    a housing wall at the rear face and mounted to the peripheral conductive housing structures; and
    first, second, and third ultra-wideband antennas aligned with respective first, second, and third openings in the ground structures, wherein the third radio-frequency transceiver is configured to transmit the ultra-wideband signals through the housing wall at the rear face using the first, second, and third ultra-wideband antennas, the antenna being configured to receive the ultra-wideband signals through the housing wall at the rear face and through a portion of the display at the front face.

13. An antenna comprising:
    an electronic device conductive housing structure;
    an antenna ground separated from the electronic device conductive housing structure by a slot;
    an antenna resonating element; and
    an antenna feed coupled to the antenna ground and to the antenna resonating element, wherein the antenna resonating element is separated from the antenna ground by a portion of the slot and the antenna resonating element comprises:
        a first arm extending from a first side of the antenna feed and having a first conductive segment that overlays the slot, wherein the first arm is configured, at least in part by a length of the first arm, to radiate in an ultra-wideband communications band, and
        a second arm extending from a second side of the antenna feed and having a second conductive segment that overlays the slot, wherein the second arm is configured, at least in part by a length of the second arm, to radiate both in the ultra-wideband communications band and in a non-ultra-wideband communications band.

14. The antenna defined in claim 13, the first arm having a harmonic mode configured to radiate in the ultra-wideband communications band and the second arm having a harmonic mode configured to radiate in the ultra-wideband communications band.

15. The antenna defined in claim 14, wherein the first arm has a fundamental mode configured to radiate in an additional ultra-wideband communications band that is lower than the ultra-wideband communications band.

16. The antenna defined in claim 15, wherein the second arm has a fundamental mode configured to radiate in the non-ultra-wideband communications band.

17. The antenna defined in claim 13, wherein the first conductive segment extends from the antenna feed, the first arm comprises a third conductive segment extending at a non-parallel angle from the first conductive segment, the second conductive segment extends from the antenna feed, the second arm comprises a fourth conductive segment having a first end extending from the second conductive segment, and the second arm comprises a fifth conductive segment extending from a second end of the fourth conductive segment, the fifth conductive segment being separated from the third conductive segment by a gap, and the antenna further comprising:

an inductor that couples the second conductive segment to the antenna ground; and a capacitor that couples the second conductive segment to the antenna ground in parallel with the inductor.

18. The antenna defined in claim 13, wherein the first arm is configured, in combination with at least a portion of the electronic device conductive housing structure, to radiate in an additional non-ultra-wideband communications band.

19. An electronic device comprising:

peripheral conductive housing structures;

ground structures separated from the peripheral conductive housing structures by a slot;

an antenna resonating element overlapping the slot; and an antenna feed coupled between the antenna resonating element and the ground structures, wherein the antenna resonating element comprises:

a first arm extending from a first side of the antenna feed, wherein the first arm has a fundamental mode configured to radiate in a first ultra-wideband communications band and has a harmonic mode configured to radiate in a second ultra-wideband communications band that is higher than the first ultra-wideband communications band, the first arm and a portion of the peripheral conductive housing structures are configured to radiate in a first non-ultra-wideband communications band and antenna currents in the first arm induce additional antenna currents on the portion of the peripheral conductive housing structures via near-field coupling; and a second arm extending from a second side of the antenna feed, wherein the second arm has a harmonic mode configured to radiate in the second ultra-wideband communications band.

20. The electronic device defined in claim 19, wherein the second arm has a fundamental mode configured to radiate in a second non-ultra-wideband communications band, the first ultra-wideband communications band comprises a first frequency between 6250 MHz and 6750 MHz, the second ultra-wideband communications band comprises a second frequency between 7750 MHz and 8250 MHz, the first non-ultra-wideband communications band comprises a third frequency between 3400 MHz and 3700 MHz, and the second non-ultra-wideband communications band comprises a fourth frequency between 5180 MHz and 5850 MHZ.

* * * * *